Dec. 31, 1940.                C. C. CARR                 2,226,844
                              EGG COOKER
                          Filed June 3, 1940
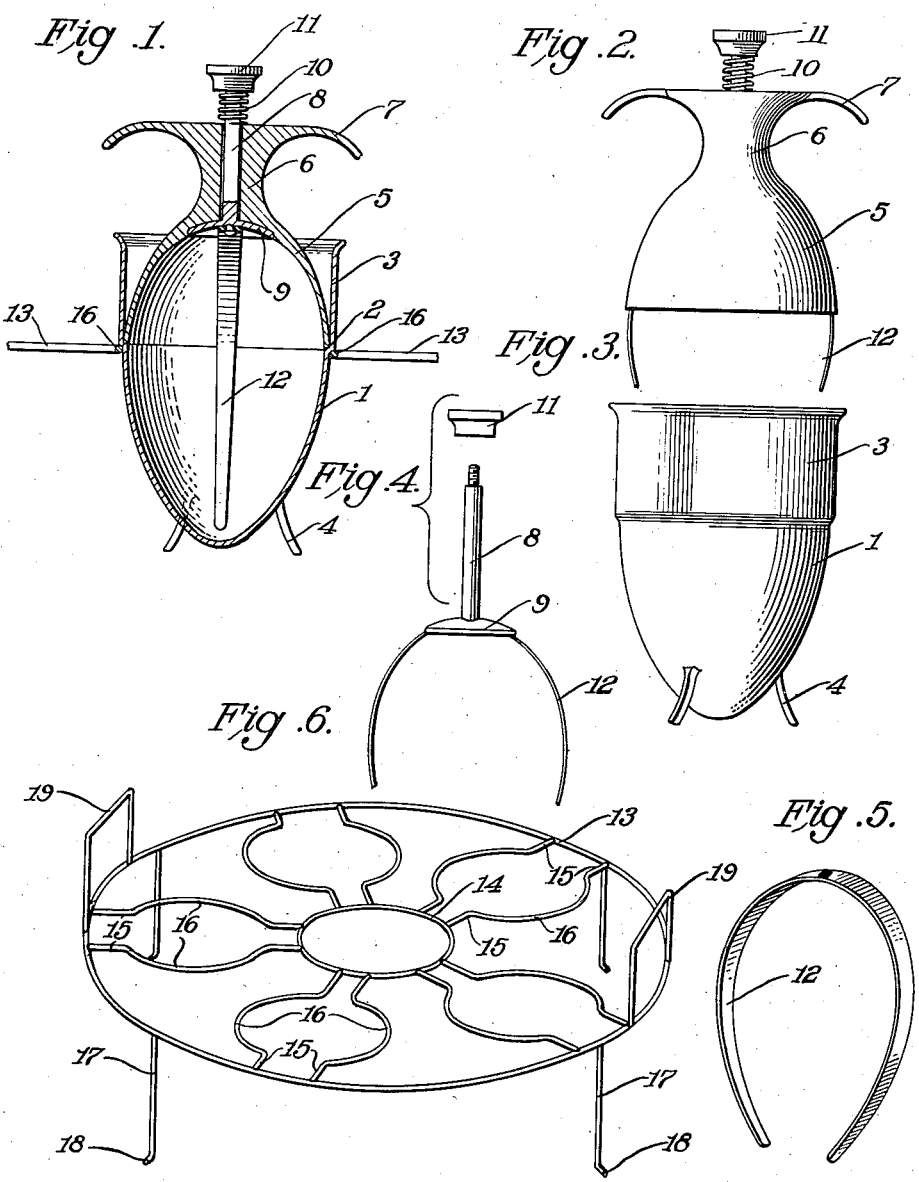
Clifton C. Carr
INVENTOR Patented Dec. 31, 1940

2,226,844

UNITED STATES PATENT OFFICE 2,226,844

EGG COOKER

Clifton C. Carr, North Powder, Oreg., assignor of one-half to Howard L. Snode, Union County, Oreg.

Application June 3, 1940, Serial No. 338,646

6 Claims. (Cl. 53—1)

This invention relates to egg cookers, and its general object is to provide a substantially egg shaped device within which a shelled egg can be cooked, so that when the egg is hard boiled it will conform to the shape of an egg cooked accordingly in its shell, and my device includes a handled top section or cover and a cup like body section, the top section having valve means for the escape of air and steam therefrom, and means for loosening and releasing the cooked egg from the device, with the result it will be seen that my cooker has all of the advantages of cooking an egg in its shell, with the added advantages of knowing the condition of the egg before it is cooked, as well as providing a cup from which the egg can be directly eaten, if desired, thus eliminating the inconvenience of handling, opening, and removing a cooked egg from its shell.

A further object is to provide a handled rack for receiving a plurality of my devices to support the latter in an upright position within a pan or the like during the cooking process, and to facilitate handling the devices.

A still further object is to provide a cooker of the character set forth, that is simple in construction, inexpensive to manufacture, and extremely efficient in use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a fragmentary vertical sectional view taken through my egg receiving and cooking device mounted in its rack.

Figure 2 is a side elevation of the top or cover section, and illustrates the egg loosening and releasing means broken away.

Figure 3 is a similar view of the body section.

Figure 4 is a view of the valve means and egg loosening means.

Figure 5 is a perspective view of the knife like element of the egg loosening means.

Figure 6 is a similar view of the rack for receiving and supporting the egg receiving devices.

Referring to the drawing in detail, and particularly to Figures 1 to 5 inclusive, the reference numeral 1 indicates the body section of my egg receiving and cooking device and which includes a lower rounded conical portion to conform substantially to the shape of a half of an egg. Formed on and rising from the conical portion in a manner to provide an annular interiorly arranged abutment shoulder 2 is a relatively wide annular flange 3 providing a shield having an outwardly flared upper end and formed on and depending from the lower portion are outwardly inclined supporting legs 4. By that construction, it will be obvious that the body section not only provides means for receiving a shelled egg within which the latter is cooked, but also provides a cup that is neat in appearance for table use and from which the cooked egg can be eaten, if desired.

The top or cover section includes a substantially dome like lower portion 5 cooperating with the body section and for that purpose, the lower edge of the dome like portion 5 is seated upon the abutment shoulder 2, as clearly shown in Figure 1, so that when an egg is hard boiled within my device, the inner surface of the walls of the lower rounded conical portion of the body section 1, and the substantially dome like lower portion of the cover section, will shape the egg to that of an egg cooked accordingly in its shell, but of course it will be understood that it is not necessary that an egg be hard boiled in my device, and that it can be cooked to any degree.

From the substantially dome like lower portion 5, a cover section extends into an inwardly rounded reduced upper portion 6 having a flat top and extending from diametrically opposite sides of the flat top is a pair of downwardly curved finger receiving members 7 providing a handle to facilitate the application and removal of the cover section with respect to the body section, as will be apparent upon inspection of Figures 2 and 3.

The upper portion 6 has a centrally disposed bore extending vertically therethrough and mounted for slidable movement and rotation within the bore is the stem 8 of a valve for releasing air and steam from the device during the process of cooking an egg therein, as will be apparent, the valve including a head 9 normally countersunk within the inner surface of the cover section and held accordingly by a coil spring 10 sleeved on the stem 8 which is of a length to extend a considerable distance above the top of the upper portion 6 and has a stud formed on the upper end thereof. Threaded on the stud is a knob 11 providing a handle and which may be serrated, or provided with wing tips extending from diametrically opposite sides thereof. In any event, the coil spring is disposed between the knob and the flat top of the upper portion and holds the head seated, as clearly shown in Figure 1.

Fixed midway its ends to the valve head 9 is a knife element 12 in the form of a bowed spring strip shaped to follow the shape of the inner surface of the device and of a length so that the lower ends of the knife element terminate in close proximity to the bottom of the body section, as shown in Figure 1, and the arm portions of the knife element are preferably tapered toward their free ends. By that construction, it will be obvious that upon rotation of the knife element, the latter will loosen the egg from the walls of the device to facilitate its removal therefrom. When it is desired to release air and steam from the device, it will be further obvious that pressure is applied to the knob 11 for moving the head 9 from its seat, and the bore is of sufficient diameter to allow for the free passage of the air and steam about the stem.

In order to support a plurality of my devices within a cooking vessel, such as a pan or the like, I provide a rack as clearly shown in Figure 6 and which is preferably formed from wire to provide an outer ring 13 and an inner ring 14. Secured to the rings for disposal between the same, is a plurality of holders, each including a pair of strands of wire having parallel portions 15 at the ends thereof and outwardly rounded intermediate portions 16 to cooperate with each other for receiving, holding and supporting one of my devices in upright position, as clearly shown in Figure 1, which illustrates that the body section includes an exterior abutment shoulder received by the outwardly rounded intermediate portions 16. Formed on and depending from the outer ring 13 are legs 17 having outwardly bent lower ends 18 providing feet and formed on and rising from diametrically opposite sides of the outer ring is a pair of bail members 19 providing handles.

From the above description and the disclosure in the drawing, it is believed that the use of my device and the rack for supporting a number of the devices will be obvious, but it might be mentioned that when it is desired to cook an egg, it is broken in the body section and the cover section is applied thereto, as shown in Figure 1, thence the device is disposed within one of the holders of the rack, and the latter is placed within a pan of water. When the egg is cooked, the cover is removed and the body section which provides a cup from which the egg can be eaten is removed from the rack, preferably after the latter has been removed from the pan through the medium of its handles, thus it will be seen that my device and rack materially overcome all of the difficulties now present in boiling, handling and removing cooked eggs from their shells. While the use of the knife element may not be necessary for soft boiled eggs, it is very desirable for removing hard boiled eggs, as by rotating the knife element through the medium of the knob 11 the egg is loosened from the walls of the device thereby allowing removal without damage to the egg.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. An egg cooking device comprising a body section, a cover section detachably associated with the body section, said sections being shaped in part to cooperate with each other when the cover section is in place to conform to the shape of an egg, a handle for the cover section, means on the body section for supporting the device in an upright position, and a relief valve carried by the cover section.

2. An egg cooking device comprising a body section, a cover section detachably associated with the body section, said sections being shaped in part to cooperate with each other when the cover section is in place to conform to the shape of an egg, a handle for the cover section, means on the body section for supporting the device in an upright position, a relief valve carried by the cover section, and means carried by the valve to facilitate the removal of a cooked egg from the device.

3. An egg cooking device comprising a cup like body section including a lower substantially body portion for receiving an egg therein, an annular flange formed on and rising from the lower portion and providing an abutment shoulder at the juncture of the flange with the lower portion, a cover section including a substantially dome shaped portion receivable within the flange to rest upon the shoulder to close the body section, oppositely directed finger receiving means formed on the cover section to provide a handle, and supporting legs formed on and depending from the body section.

4. An egg cooking device comprising a body section, a cover section detachably associated with the body section, said sections being shaped in part to cooperate with each other when the cover section is in place to conform to the shape of an egg, a handle for the cover section, means on the body section for supporting the device in an upright position, a spring pressed relief valve including a stem slidably mounted in the cover section and extending vertically therethrough, a head on the lower end of said stem, the cover section having a seat therein normally receiving the head, and a knob on the upper end of the stem for opening the valve against the action of its spring.

5. An egg cooking device comprising a body section, a cover section detachably associated with the body section, said sections being shaped in part to cooperate with each other when the cover section is in place to conform to the shape of an egg, a handle for the cover section, means on the body section for supporting the device in an upright position, a spring pressed relief valve including a stem slidably and rotatably mounted in the cover section and extending vertically therethrough, a head on the lower end of said stem, a cover section having a seat therein normally receiving the head, a knob on the upper end of the stem for opening the valve against the action of its spring, and a knife element conforming to the shape of the interior surfaces of said sections and carried by the stem to be rotated thereby for loosening a cooked egg from the device to facilitate the removal of the egg therefrom.

6. In a cooker for eggs, a device comprising a body section for receiving an egg therein, a cover section detachably associated with the body section, a rack for disposal within a cooking vessel and comprising inner and outer concentrically arranged rings, strands of wire bridging the rings and having their ends secured thereto, said strands being arranged in spaced pairs and the strands of each pair being outwardly rounded intermediate their ends for cooperation with each other to fittingly receive and to hold the device in an upright position within the vessel for the disposal of the devices in spaced relation with respect to each other, bail type handles secured to and rising from diametrically opposite sides of the outer ring, and legs formed on and depending from the outer ring and having outwardly bent lower ends providing feet.

CLIFTON C. CARR.